US010467749B2

(12) United States Patent
Xu et al.

(10) Patent No.: US 10,467,749 B2
(45) Date of Patent: Nov. 5, 2019

(54) METHOD AND SYSTEM FOR PROCESSING AN IMAGE COMPRISING SPOTS IN NUCLEIC ACID SEQUENCING

(71) Applicant: DIRECT GENOMICS CO., LTD., Shenzhen (CN)

(72) Inventors: Weibin Xu, Shenzhen (CN); Huan Jin, Shenzhen (CN); Qin Yan, Shenzhen (CN); Zefei Jiang, Shenzhen (CN); Zhiliang Zhou, Shenzhen (CN)

(73) Assignee: GENEMIND BIOSCIENCES COMPANY LIMITED, Shenzhen (CN)

( * ) Notice: Subject to any disclaimer, the term of this patent is extended or adjusted under 35 U.S.C. 154(b) by 21 days.

(21) Appl. No.: 15/725,552

(22) Filed: Oct. 5, 2017

(65) Prior Publication Data
US 2018/0101951 A1    Apr. 12, 2018

(30) Foreign Application Priority Data

Oct. 10, 2016    (CN) .......................... 2016 1 0882547
Jul. 24, 2017    (CN) .......................... 2017 1 0607306

(51) Int. Cl.
*G06K 9/00*    (2006.01)
*G06K 9/40*    (2006.01)
(Continued)

(52) U.S. Cl.
CPC .............. *G06T 7/0012* (2013.01); *G06K 9/00* (2013.01); *G06K 9/0014* (2013.01); *G06K 9/40* (2013.01);
(Continued)

(58) Field of Classification Search
None
See application file for complete search history.

(56) References Cited

U.S. PATENT DOCUMENTS

| 2005/0234656 A1* | 10/2005 | Schwartz ........... G06K 9/00134 |
| | | 702/20 |
| 2011/0268347 A1* | 11/2011 | Staker ...................... G06K 9/32 |
| | | 382/151 |
| 2014/0349281 A1 | 11/2014 | Jennings |

FOREIGN PATENT DOCUMENTS

| CN | 101930116 A | 12/2010 |
| CN | 102174384 A | 9/2011 |

(Continued)

OTHER PUBLICATIONS

Binggang, "High-throughput Genome Sequencing Image Processing and Data Analysis," A Dissertation Submitted for the Degree of Doctor of Philosophy, South China University of Technology, Guangzhou, China, 2010,11:34-35, 46-49.
(Continued)

*Primary Examiner* — Idowu O Osifade
(74) *Attorney, Agent, or Firm* — Seed Intellectual Property Law Group LLP

(57) ABSTRACT

The present disclosure provides a method and a system for processing an image. The method includes: an image pre-processing step, including analyzing an image input to be processed so as to obtain a first image; and a spot detecting step, including analyzing the first image so as to compute a spot determining threshold; analyzing the first image so as to acquire a candidate pixel spot, and judging whether the candidate pixel spot is the spot according to the spot determining threshold; computing a sub-pixel center coordinate of the spot and an intensity value of the sub-pixel center coordinate if yes; and discarding the candidate pixel spot if no. According to the method, the image is denoised in the image pre-processing step, such that a calculation in the spot detecting step may be reduced. In addition, the accuracy of determining the image spot may be improved.

20 Claims, 15 Drawing Sheets

(51) Int. Cl.
*G06T 7/194* (2017.01)
*G06T 7/00* (2017.01)
*G06T 7/136* (2017.01)
*G06T 5/20* (2006.01)

(52) U.S. Cl.
CPC ........... *G06T 7/136* (2017.01); *G06T 5/20* (2013.01); *G06T 7/194* (2017.01); *G06T 2207/20024* (2013.01); *G06T 2207/30024* (2013.01); *G06T 2207/30072* (2013.01)

(56) References Cited

FOREIGN PATENT DOCUMENTS

| CN | 102354398 A | 2/2012 |
| CN | 103582697 A | 2/2014 |
| CN | 104297249 A | 1/2015 |
| CN | 105039147 A | 11/2015 |
| CN | 105205788 A | 12/2015 |
| CN | 105389581 A | 3/2016 |
| CN | 105741266 A | 7/2016 |
| JP | 2007-315772 A | 12/2007 |
| KR | 10-1348680 B1 | 1/2014 |
| WO | 2016/107896 A1 | 7/2016 |

OTHER PUBLICATIONS

Ghaye et al., "Image Thresholding Techniques for Localization of Sub-Resolution Fluorescent Biomarkers," *Cytometry Part A 83A*:1001-1016 (2013).

He et al., (2011) "A Laplacian of Gaussian-Based Approach for Spot Detection in Two-Dimensional Gel Electrophoresis Images." In: Li D., Liu Y., Chen Y. (eds) *Computer and Computing Technologies in Agriculture IV. CCTA* (2010). IFIP Advances in Information and Communication Technology, 347:8-15. Springer, Berlin, Heidelberg.

Smal et al., "Quantitative Comparison of Spot Detection Methods in Fluorescence Microscopy," *IEEE Transactions on Medical Imaging* 29(2):282-301 (Feb. 2010).

* cited by examiner

| NotMax | NotMax | NotMax |
| --- | --- | --- |
| NotMax | Max | NotMax |
| NotMax | NotMax | NotMax |

METHOD AND SYSTEM FOR PROCESSING AN IMAGE COMPRISING SPOTS IN NUCLEIC ACID SEQUENCING

CROSS REFERENCE TO RELATED APPLICATION

This application claims the benefit under 35 U.S.C. 119(a)-(d) to Chinese Application No. 201610882547.8, filed Oct. 10, 2016, and Chinese Application No. 201710607306.7, filed Jul. 24, 2017, which applications are hereby incorporated by reference in their entireties.

FIELD

The present disclosure relates to a field of image processing technology, and more particularly relates to a method and a system for processing an image and a computer readable memory medium.

BACKGROUND

In related arts, the application of spot/peak detection is important in a gene sequencer and an LED light source.

Image analysis is a significant branch in a sequencing system based on the principle of optical imaging. Accuracy of gene sequencing directly depends on the accuracy of positioning image brightness.

How to improve the accuracy of determining an image spot in a process for nucleotide sequence analysis becomes a problem to be solved.

SUMMARY

Embodiments of the present disclosure seek to solve at least one of the problems existing in the related art to at least some extent. Accordingly, embodiments of the present disclosure provide a method and a system for processing an image in gene sequencing and a computer readable memory medium.

A method for processing an image is provided according to an embodiment of the present disclosure. The method includes: an image pre-processing step, including: analyzing a to-be-processed image so as to obtain a first image, in which the to-be-processed image includes at least one spot having at least one pixel point; and a spot detecting step, including: analyzing the first image so as to compute a spot determining threshold; analyzing the first image so as to acquire a candidate spot; and judging whether the candidate spot is the spot according to the spot determining threshold; if yes, computing a sub-pixel center coordinate of the spot and/or an intensity value of the sub-pixel center coordinate, if no, discarding the candidate spot.

A system for processing an image is provided according to an embodiment of the present disclosure. The system includes: an image pre-processing module, configured to analyze an to-be-processed image so as to obtain a first image, in which the to-be-processed image includes at least one spot having at least one pixel point; and a spot detecting module, configured to analyze the first image so as to compute a spot determining threshold; to analyze the first image so as to acquire a candidate spot; and to judge whether the candidate spot is the spot according to the spot determining threshold.

An image processing system is also provided according to an embodiment of the present disclosure. The image processing system includes: a data inputting unit, configured to input data; a data outputting unit, configured to output data; a memory unit, configured to store data including a computer executable program; and a processor, configured to execute the computer executable program for performing the method for processing an image according to any implementation described above. The image processing system may improve the accuracy of determining the image spot.

A computer readable memory medium is also provided according to an embodiment of the present disclosure. The computer readable memory medium is configured to store a program that, when executed by a computer, causes the computer to perform the method for processing an image according to any implementation described above.

The above methods, devices and systems for processing an image, the to-be-processed image is processed in the image pre-processing step, such that computation in the spot detecting step may be decreased. In addition, it is judged whether the candidate spot is the spot according to the spot determining threshold, such that the accuracy of determining the image spot is improved.

There is no specific limitation on the to-be-processed image (i.e., the original input data) in the method provided in the present disclosure, which means that the method is suitable for processing and analyzing any image generated by platforms for performing the nucleotide sequence analysis based on the principle of optical detection, including but not limited to a second and third generation sequencing. The method has a high accuracy, a high universality and a high speed, and can acquire more valid information from the image.

Specifically at present, known image processing methods and systems in gene sequencing are developed for the image processing of a platform using the second generation sequencing. Since a sequencing chip using in the second generation sequencing is usually a pattern array (probes on the sequencing chip are arranged regularly), the image captured is a pattern image which is easy to process and analyze. Additionally, a nucleotide template amplification is used in the second generation sequencing, and therefore a high intensity spot may be acquire when the image is collected, which can be identified and positioned easily. In the image processing methods based on the general second generation sequencing, it is unnecessary to have a high positioning accuracy, the sequencing may be accomplished only by selecting and positioning spots with bright/strong light (spot).

Moreover, the third generation sequencing (single molecule sequencing) is subject to the development of chip surface processing technology at present, the chip for sequencing is a random array, which means that the probes on the chip are arranged randomly. The image captured is an image having randomly distributed spots which is hard to process and analyze. Further, the image processing analysis for the single molecule sequencing is a key factor for identifying reads, however the single molecule sequencing has a higher requirement for image processing and spot detection, i.e., it is required to position all spots in the image precisely so as to identify bases directly and to generate data.

Thus, the method, device and/or system for processing an image provided in the present disclosure is suitable for both the second and the third generation sequencing. It is advantageous for processing the random image in the third generation sequencing and for the image processing having a high precise requirement especially.

Specifically, the present disclosure provides the following subject matter/items:

1. A method for processing an image, comprising:
an image pre-processing step, comprising: analyzing a to-be-processed image so as to obtain a first image, wherein the to-be-processed image comprises at least one spot having at least one pixel point; and
a spot detecting step, comprising:
analyzing the first image so as to compute a spot determining threshold;
analyzing the first image so as to acquire a candidate spot; and
judging whether the candidate spot is the spot according to the spot determining threshold.

2. A method according to item 1, wherein the image pre-processing step comprises performing a background subtraction on the to-be-processed image so as to acquire the first image.

3. A method according to item 2, wherein the image pre-processing step comprises simplifying the to-be-processed image after the background subtraction so as to acquire the first image.

4. A method according to item 1, wherein the image pre-processing step comprises filtering the to-be-processed image so as to acquire the first image.

5. A method according to item 1, wherein the image pre-processing step comprises filtering the to-be-processed image after a background subtraction, so as to acquire the first image.

6. A method according to item 5, wherein the image pre-processing step comprises simplifying the to-be-processed image after the background subtraction and the filtering so as to acquire the first image.

7. A method according to item 1, wherein the image pre-processing step comprises simplifying the to-be-processed image so as to acquire the first image.

8. A method according to item 1, wherein the spot detecting step comprises:
computing a sub-pixel center coordinate of the spot and/or an intensity value of the sub-pixel center coordinate, when it is judged that the candidate spot is the spot; and
discarding the candidate spot, when it is judged that the candidate spot is not the spot.

9. A method according to any of items 2, 3, 5 and 6, wherein performing a background subtraction on the to-be-processed image comprises:
determining a background of the to-be-processed image by an opening operation; and
performing the background subtraction on the to-be-processed image according to the background.

10. A method according to any of items 4-6, wherein the filtering is a Mexican Hat filtering.

11. A method according to item 10, wherein performing the Mexican Hat filtering comprises:
performing a Gaussian filtering on the to-be-processed image using an m*m window, where m is an odd number greater than 1; and
performing a two-dimensional Laplacian sharpening on the to-be-processed image after the Gaussian filtering.

12. A method according to any of items 3, 6 and 7, wherein the simplifying is a binary processing.

13. A method according to any of items 3, 6, and 7, wherein the simplifying comprises acquiring a signal-to-noise ratio matrix according to the to-be-processed image before the simplifying, and simplifying the to-be-processed image before the simplifying according to the signal-to-noise ratio matrix so as to acquire the first image.

14. A method according to item 1, wherein analyzing the first image so as to compute a spot determining threshold comprises:
processing the first image by an Otsu method so as to compute the spot determining threshold.

15. A method according to any of items 3, 6, and 7, wherein judging whether the candidate spot is the spot according to the spot determining threshold comprises:
searching in the first image for a pixel point with connectivity greater than (p*p−1) as a center of the candidate spot; and
judging whether the center of the candidate spot satisfies a condition of $I_{max}*A_{BI}*ceof_{guass}>T$, where $I_{max}$ is a maximum intensity of a center of the p*p window, $A_{BI}$ is a proportion of pixels in the first image being a set value in the p*p window, $ceof_{guass}$ is a correlation coefficient between a pixel in the p*p window and a two-dimensional Gaussian distribution, and T is the spot determining threshold, where p is an odd number greater than 1;
determining a spot corresponding to the center of the candidate spot as the spot when the condition is satisfied; and
discarding the spot corresponding to the center of the candidate spot when the condition fails to be satisfied.

16. A method according to item 8, wherein computing a sub-pixel center coordinate of the spot and/or an intensity value of the sub-pixel center coordinate comprises:
computing the sub-pixel center coordinate of the spot by a quadratic function interpolation, and/or computing the intensity value of the sub-pixel center coordinate by a quadratic spline interpolation.

17. A method according to item 8, further comprising:
indicating by an identifier a location of the sub-pixel center coordinate of the spot in the first image and/or in the to-be-processed image.

18. A system for processing an image, comprising:
an image pre-processing module, configured to analyze a to-be-processed image so as to obtain a first image, wherein the to-be-processed image comprises at least one spot having at least one pixel point; and
a spot detecting module, configured to analyze the first image so as to compute a spot determining threshold; to analyze the first image so as to acquire a candidate spot; and to judge whether the candidate spot is the spot according to the spot determining threshold.

19. A system according to item 18, wherein the image pre-processing module comprises a background subtraction module, the background subtraction module is configured to perform a background subtraction on the to-be-processed image so as to acquire the first image.

20. A system according to item 19, wherein the image pre-processing module comprises a simplifying module, the simplifying module is configured to simplify the to-be-processed image after the background subtraction so as to acquire the first image.

21. A system according to item 18, wherein the image pre-processing module comprises a filtering module, the filtering module is configured to filter the to-be-processed image so as to acquire the first image.

22. A system according to item 18, wherein the image pre-processing module comprises a background subtraction module and a filtering module, the background subtraction module is configured to perform a background subtraction on the to-be-processed image, the filtering module is configured to filter the to-be-processed image after the background subtraction, so as to acquire the first image.

23. A system according to item 22, wherein the image pre-processing module comprises a simplifying module, the simplifying module is configured to simplify the to-be-processed image after the background subtraction and the filtering so as to acquire the first image.

24. A system according to item 18, wherein the image pre-processing module comprises a simplifying module, the simplifying module is configured to simplify the to-be-processed image so as to acquire the first image.

25. A system according to item 18, wherein the spot detecting module is configured to compute a sub-pixel center coordinate of the spot and/or an intensity value of the sub-pixel center coordinate, when it is judged that the candidate spot is the spot; and to discard the candidate spot, when it is judged that the candidate spot is not the spot.

26. A system according to any of items 19, 20, 22, and 23, wherein the background subtraction module is configured to determine a background of the to-be-processed image by an opening operation; and to perform the background subtraction on the to-be-processed image according to the background.

27. A system according to any of items 21-23, wherein the filtering is a Mexican Hat filtering.

28. A system according to item 27, wherein the filtering module is configured to perform a Gaussian filtering on the to-be-processed image before the filtering using an m*m window, where m is an odd number greater than 1; and to perform a two-dimensional Laplacian sharpening on the to-be-processed image after the Gaussian filtering.

29. A system according to any of items 20, 23 and 24, wherein the simplifying is a binary processing.

30. A system according to any of claims 20, 23, and 24, wherein the simplifying module is configured to acquire a signal-to-noise ratio matrix according to the to-be-processed image before the simplifying, and to simplify the to-be-processed image before the simplifying according to the signal-to-noise ratio matrix so as to acquire the first image.

31. A system according to claim 18, wherein the spot detecting module is configured to process the to-be-processed image by an Otsu method so as to compute the spot determining threshold.

32. A system according to any of items 20, 23 and 24, wherein the spot detecting module is configured to search in the first image for a pixel point with connectivity greater than (p*p−1) as a center of the candidate spot; and judge whether the center of the candidate spot satisfies a condition of $I_{max}*A_{BI}*ceof_{guass}>T$, where $I_{max}$ is a maximum intensity of a center of the p*p window, $A_{BI}$ is a proportion of pixels in the first image being a set value in the p*p window, $ceof_{guass}$ is a correlation coefficient between a pixel in the p*p window and a two-dimensional Gaussian distribution, and T is the spot determining threshold, where p is an odd number greater than 1;

determine a spot corresponding to the center of the candidate spot as the spot when the condition is satisfied; and discard the spot corresponding to the center of the candidate spot when the condition fails to be satisfied.

33. A system according to claim 25, wherein the spot detecting module is configured to:

compute the sub-pixel center coordinate of the spot by a quadratic function interpolation, and/or compute the intensity value of the sub-pixel center coordinate by a quadratic spline interpolation.

34. A system according to claim 25, wherein the system comprises an indicating module, configured to:

indicate by an identifier a location of the sub-pixel center coordinate of the spot in the first image and/or in the to-be-processed image.

35. An image processing system, comprising:

a data inputting unit, configured to input data;

a data outputting unit, configured to output data;

a memory unit, configured to store data comprising a computer executable program; and a processor, configured to perform the computer executable program for performing the method for processing an image in gene sequencing according to any of items 1-17.

36. A computer readable memory medium, configured to store a program that when executed by a computer causes the computer to perform the method for processing an image in gene sequencing according to any of items 1-17.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
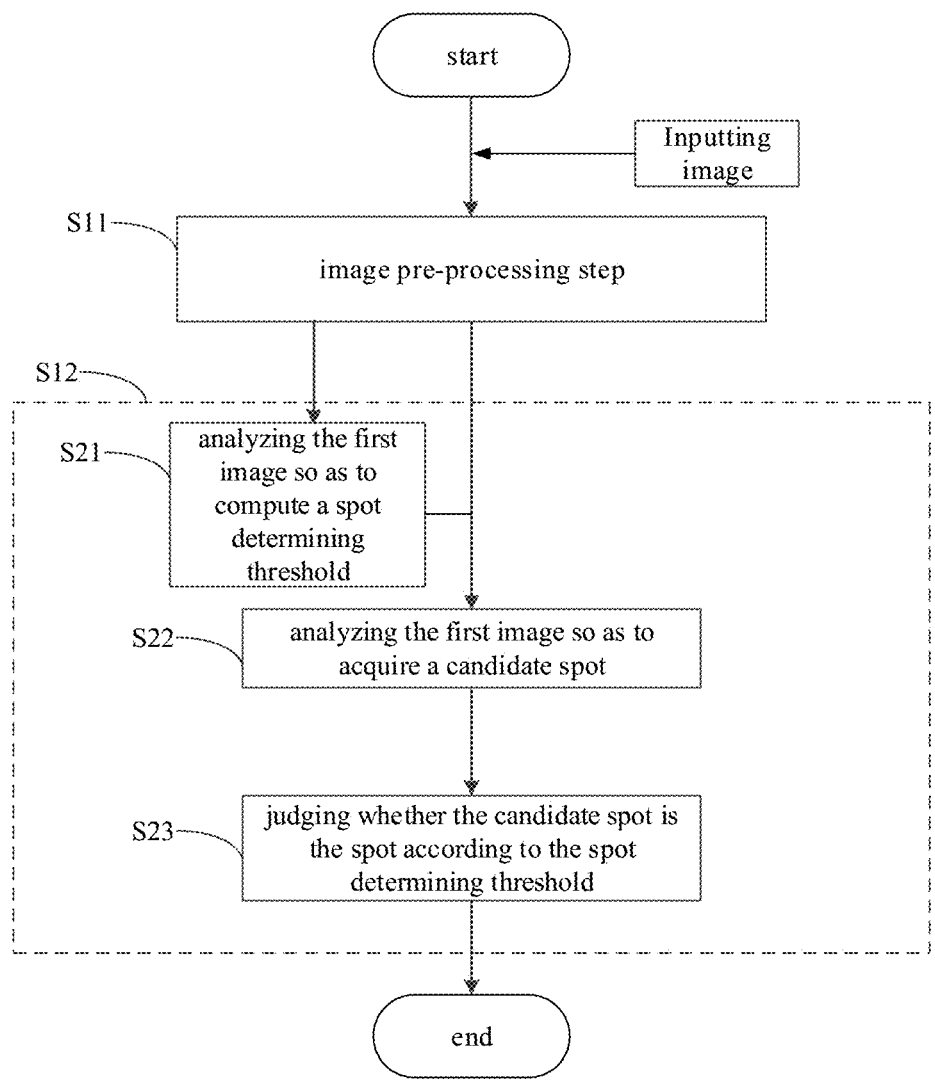
FIG. 1 is a flow chart of a method for processing an according to an embodiment of the present disclosure.

Reference will be made in detail to embodiments of the present disclosure, where the same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure. Instead, the embodiments of the present disclosure comprise all the variants, modifications and their equivalents within the spirit and scope of the present disclosure as defined by the claims.

In the description of the disclosure, it should be understood that terms such as "first" and "second" are used herein for purposes of description and are not intended to indicate or imply relative importance or significance. Thus, the feature defined with "first" and "second" may comprise one or more this feature. In the description of the present disclosure, "a plurality of" means two or more than two, unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

For a purpose of simplicity and clear, reference numbers and/or reference letters may be repeatedly used in different examples of the present disclosure, while the reference numbers and the reference letters are not used to instruct the relationship between the various implementations and/or configurations.

The term "gene sequencing" in implementations of the present disclosure is the same as nucleic acid sequencing, including DNA sequencing and/or RNA sequencing, and including long fragment sequencing and/or short fragment sequencing.

The term "spot" refers to a luminous point on the image, in which one luminous point occupies at least one pixel point, and the term "pixel point" refers to a pixel.

In implementations of the present disclosure, the image comes from a sequencing platform based on the principle of optical imaging, in which the sequencing platform includes but is not limited to CG (Complete Genomics), Illumina/Solexa, Life Technologies ABI SOLiD and Roche 454 etc. Detecting the spot refers to detecting an optical signal of an extended base or a base cluster.

In an implementation of the present disclosure, the image comes from a single molecule sequencing platform such as Helicos, in which the original input data is parameters of the pixel points of the image, and detecting the spot refers to detecting an optical signal of the single molecule.

Referring to FIG. 1, a method for processing an image is provided in the implementation of the present disclosure. The method includes: an image pre-processing step S11, including: analyzing a to-be-processed image so as to obtain a first image, in which the to-be-processed image includes at least one spot having at least one pixel point; and a spot detecting step S12, including: step S21, analyzing the first image so as to compute a spot determining threshold; step S22, analyzing the first image so as to acquire a candidate spot; and step S23, judging whether the candidate spot is the spot according to the spot determining threshold. With the method for processing an image, the to-be-processed image is processed in the image pre-processing step, such that computation in the spot detecting step may be decreased. In addition, by judging whether the candidate spot is the spot according to the spot determining threshold, the accuracy of determining the image spot is improved.

Specifically, in an example, an inputted to-be-processed image may be a 16-bit TIFF image of size 512*512 or 2048*2048, and the TIFF image may be a grayscale image. Thus, the processing procedure of this method may be simplified.

Figure 2:
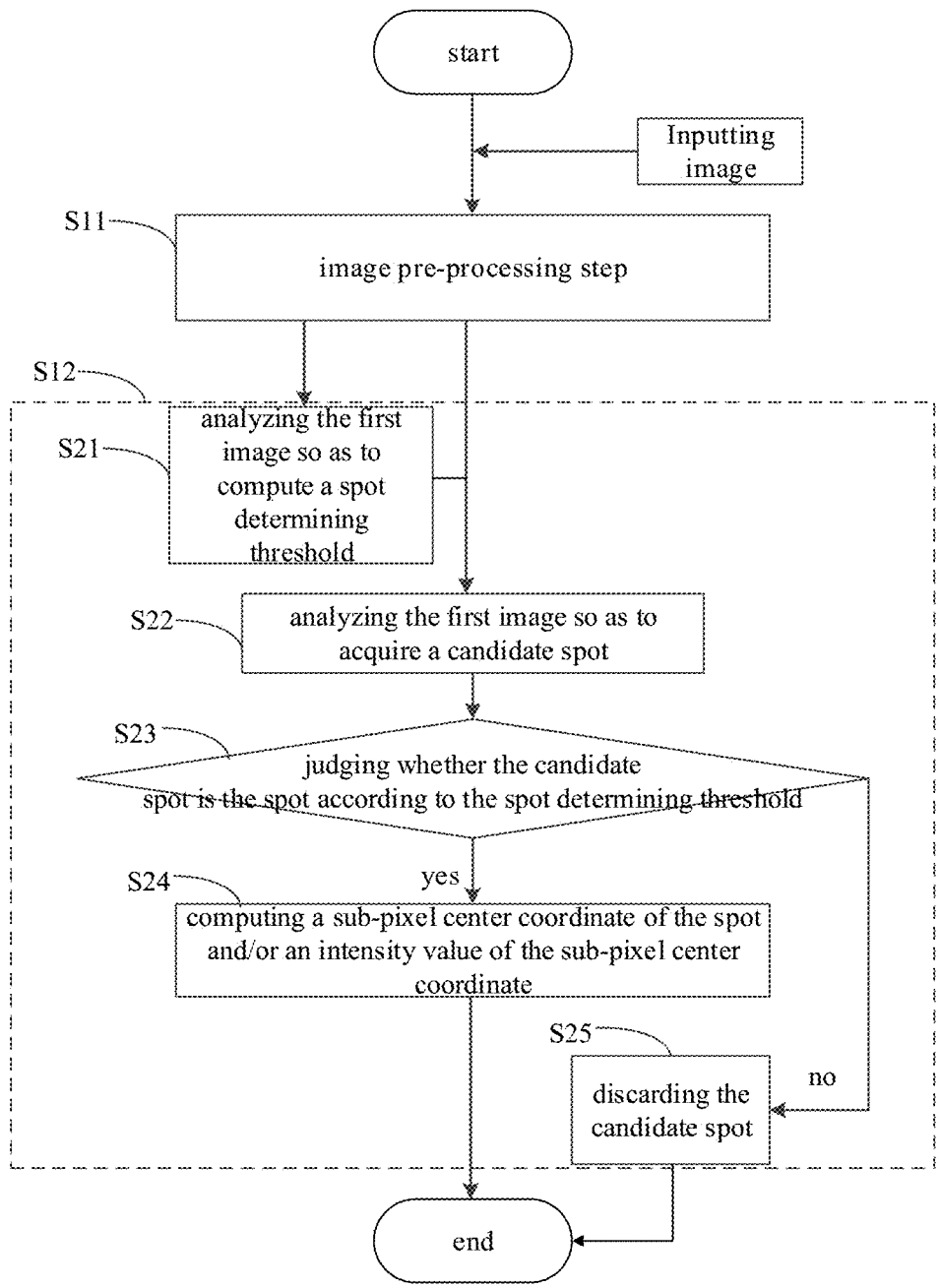
FIG. 2 is a flow chart of a method for processing an image according to an embodiment of the present disclosure.

Referring to FIG. 2, in some implementations of the method for processing an image, the spot detecting step also includes: step S24, computing a sub-pixel center coordinate of the spot and/or an intensity value of the sub-pixel center coordinate, when it is judged that the candidate spot is the spot; and step S25, discarding the candidate spot, when it is judged that the candidate spot is not the spot. In this way, the center coordinate of the spot and/or the intensity value of the center coordinate may be represented by the sub-pixel, such that the accuracy of the method for processing an image may be further improved.

Figure 3:
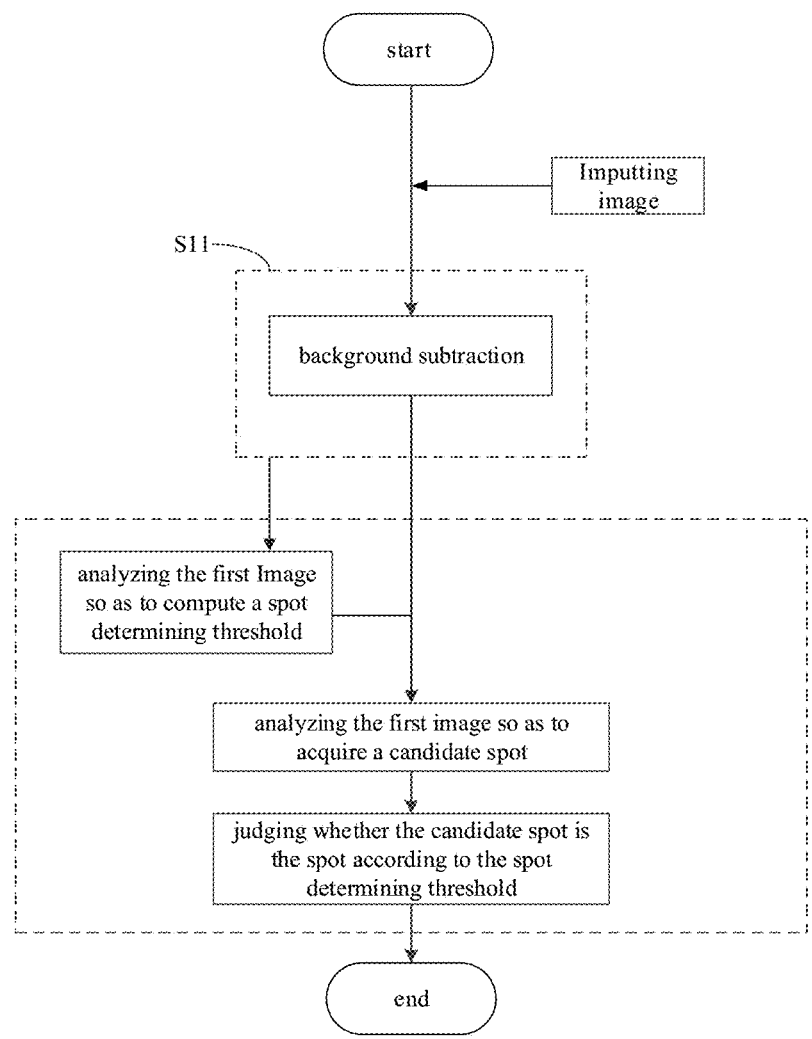
FIG. 3 is a flow chart of a method for processing an image according to an embodiment of the present disclosure.

Referring to FIG. 3, in some implementations of the method for processing an image, the image pre-processing step S11 includes: performing a background subtraction on the to-be-processed image so as to acquire the first image. Thus, the noise of the to-be-processed image may be decreased, such that the accuracy of the method for processing an image is improved.

Figure 4:
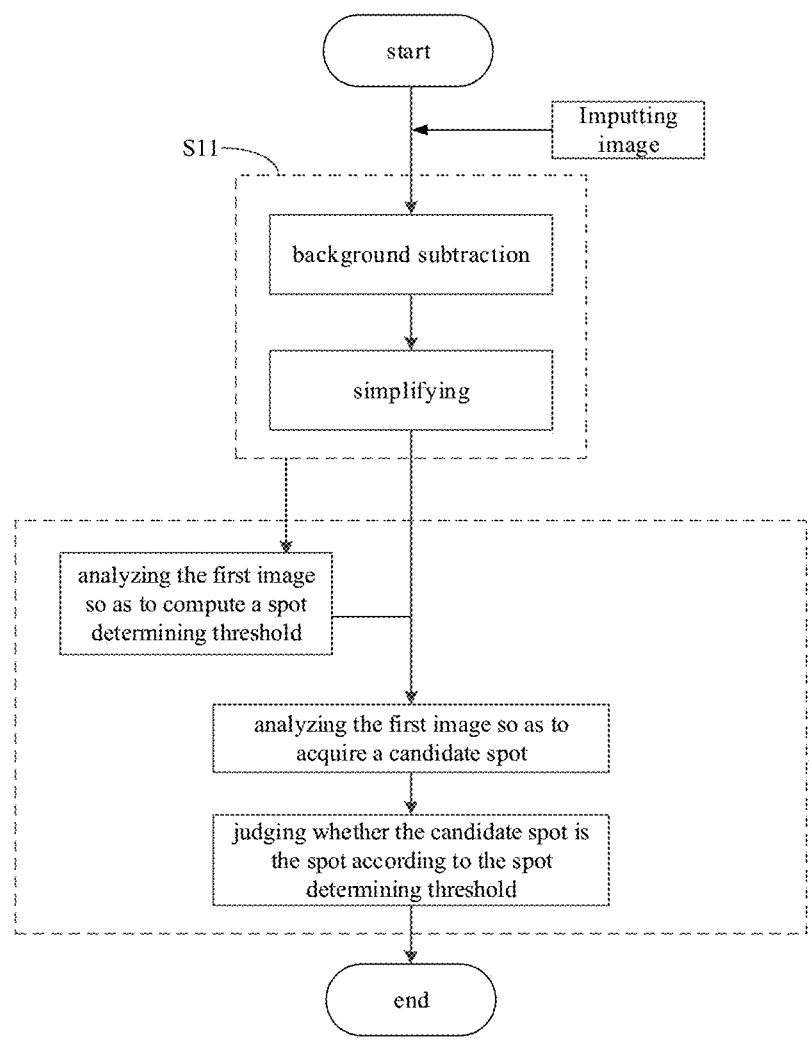
FIG. 4 is a flow chart of a method for processing an image according to an embodiment of the present disclosure.

Referring to FIG. 4, in some implementations of the method for processing an image, the image pre-processing step S11 includes: simplifying the to-be-processed image after the background subtraction so as to acquire the first image. Thus, the computation in the subsequent steps of the image processing method may be decreased.

Figure 5:
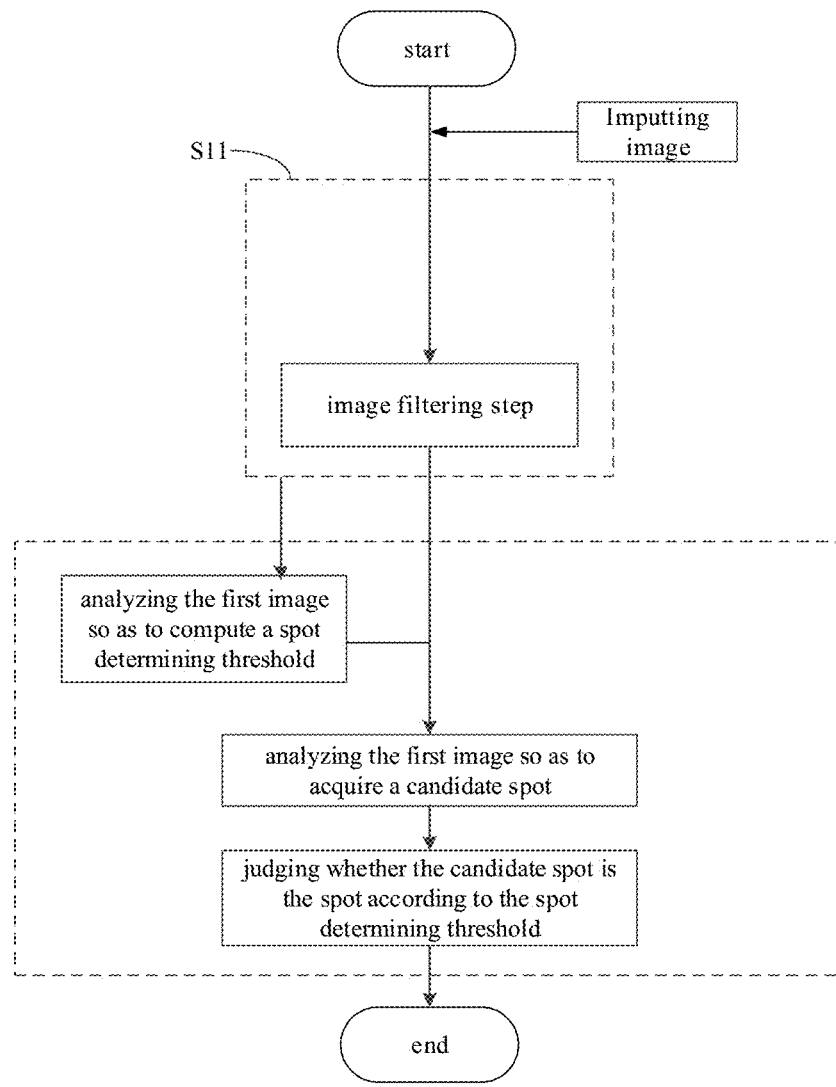
FIG. 5 is a flow chart of a method for processing an image according to an embodiment of the present disclosure.

Referring to FIG. 5, in some implementations of the method for processing an image, the image pre-processing step S11 includes: filtering the to-be-processed image so as to acquire the first image. Thus, the first image may be acquired by filtering in case of maintaining image detail features to the greatest extent, such that the accuracy of the method for processing an image is improved.

Figure 6:
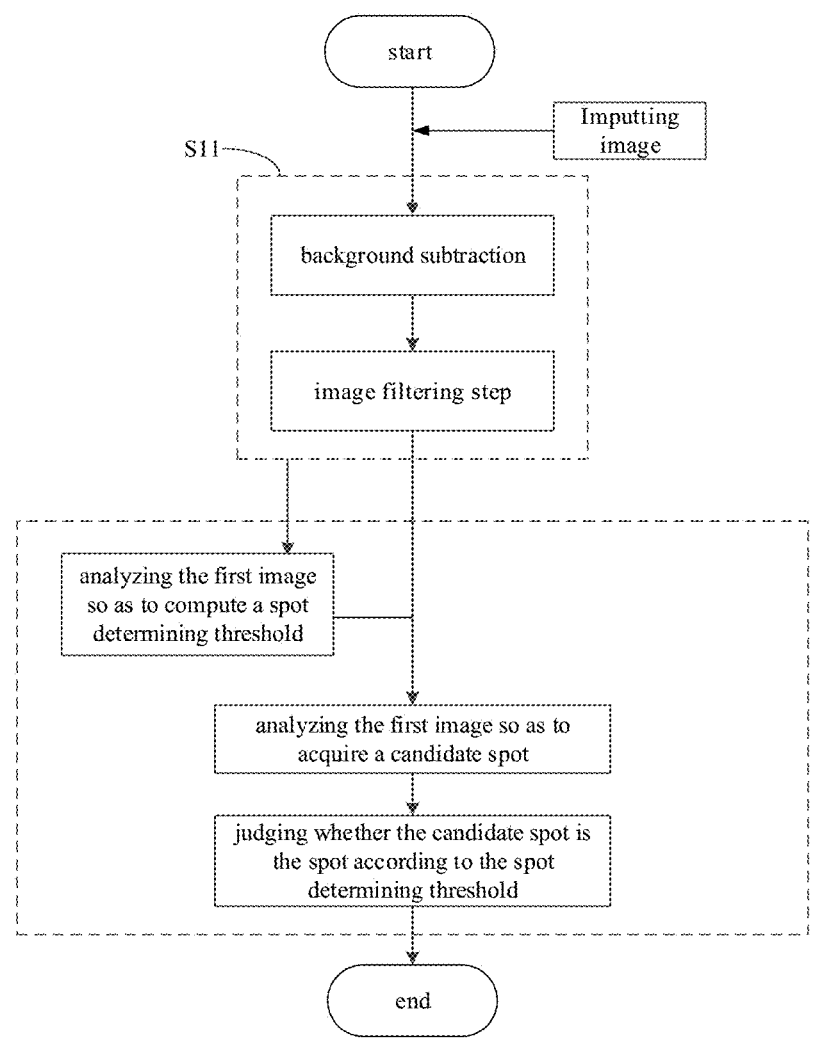
FIG. 6 is a flow chart of a method for processing an image according to an embodiment of the present disclosure.
Figure 7:
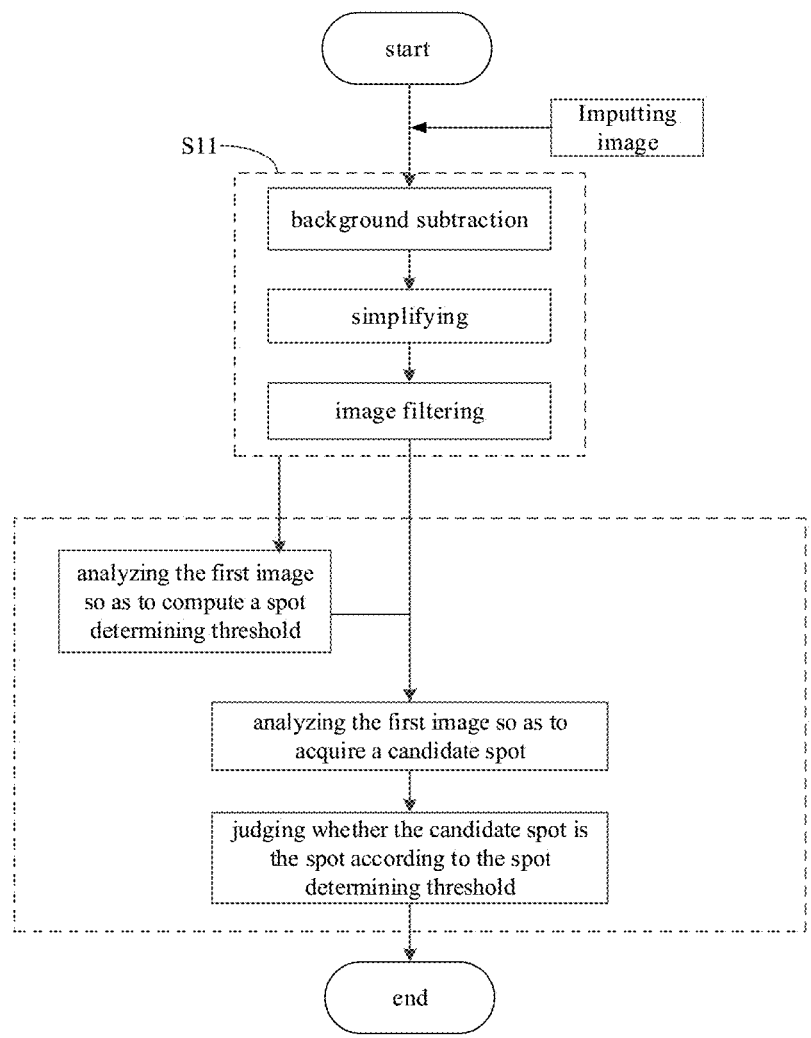
FIG. 7 is a flow chart of a method for processing an image according to an embodiment of the present disclosure.

Referring to FIG. 6, in some implementations of the method for processing an image, the image pre-processing step S11 includes: performing a background subtraction on the to-be-processed image, and then filtering, so as to acquire the first image. Thus, filtering the to-be-processed image after the background subtraction may further decrease the noise of the to-be-processed image, such that the accuracy of the method for processing an image is improved.

Referring to FIG. 7, in some implementations of the method for processing an image, the image pre-processing step S11 includes: simplifying the to-be-processed image after the background subtraction and the filtering so as to acquire the first image. Thus, the computation in the subsequent steps of the image processing method may be decreased.

Figure 8:
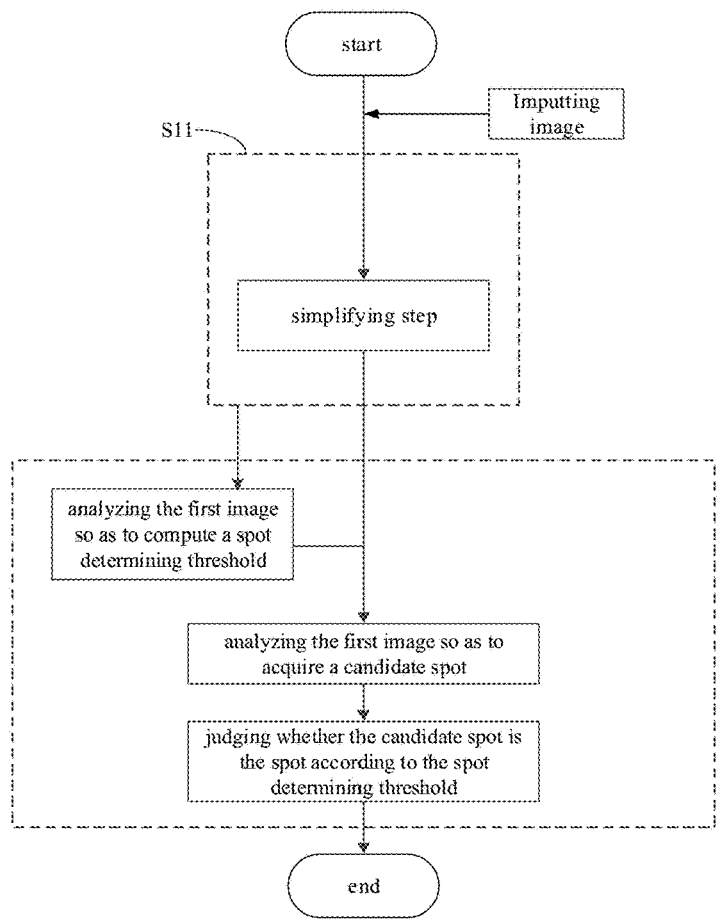
FIG. 8 is a flow chart of a method for processing an image according to an embodiment of the present disclosure.

Referring to FIG. 8, in some implementations of the method for processing an image, the image pre-processing step S11 includes: simplifying the to-be-processed image so as to acquire the first image. Thus, the computation in the subsequent steps of the image processing method may be decreased.

In some implementations of the method for processing an image, performing a background subtraction on the to-be-processed image includes: determining a background of the to-be-processed image by an opening operation; and performing the background subtraction on the to-be-processed image according to the background. In this way, the opening operation is for eliminating small objects, splitting objects at tenuous points and smoothing boundaries of big objects without changing the area of the image, such that the background subtracted image may be acquired precisely.

Specifically, in implementations of the present disclosure, the to-be-processed image (such as a grayscale image) is shifted by an a*a window (such as a 15*15 window), and the background of the to-be-processed image may be estimated using the opening operation (corroding first and expanding thereafter), as shown in formula 1 and formula 2:

$$g(x,y) = erode[f(x,y),B] = \min\{f(x+x',y+y') - B(x',y') | (x',y') \in D_b\}$$ formula 1 where g(x, y) represents a corroded grayscale image, f(x, y) represents the original grayscale image, and B represents a structural element;

$$g(x,y) = dilate[f(x,y),B] = \max\{f(x-x',y-y') - B(x',y') | (x',y') \in D_b\}$$ formula 2 where g(x, y) represents an expanded grayscale image, f(x, y) represents the original grayscale image, and B represents the structural element.

Therefore, the background noise may be acquired according to:

$$g = imopen(f(x,y),B) = dilate[erode(f(x,y),B)]$$ formula 3

The background subtraction is performed on the original image according to formula 4.

$$f = f - g = \{f(x,y) - g(x,y) | (x,y) \in D\}$$ formula 4

It could be understood that the specific methods of performing a background subtraction on the to-be-processed image in the present implementations may be applied to the steps of performing background subtraction on the image mentioned in any of the above-described implementations.

In some implementations of the method for processing an image, performing the filtering is performing a Mexican Hat filtering. It is easy to perform the Mexican Hat filtering on an image and the cost of the method for processing an image may be reduced. Additionally, a contrast ratio of the foreground and the background may be improved by performing the Mexican Hat filtering, i.e., making the foreground brighter and the background darker.

The Mexican Hat filtering may be performed as follows: performing a Gaussian filtering on the to-be-processed image before the filtering using an m*m window, and performing a two-dimensional Laplacian sharpening on the to-be-processed image after the Gaussian filtering. m is a natural number and particularly, an odd number greater than 1. In this way, the Mexican Hat filtering may be accomplished by two steps.

Figure 9:
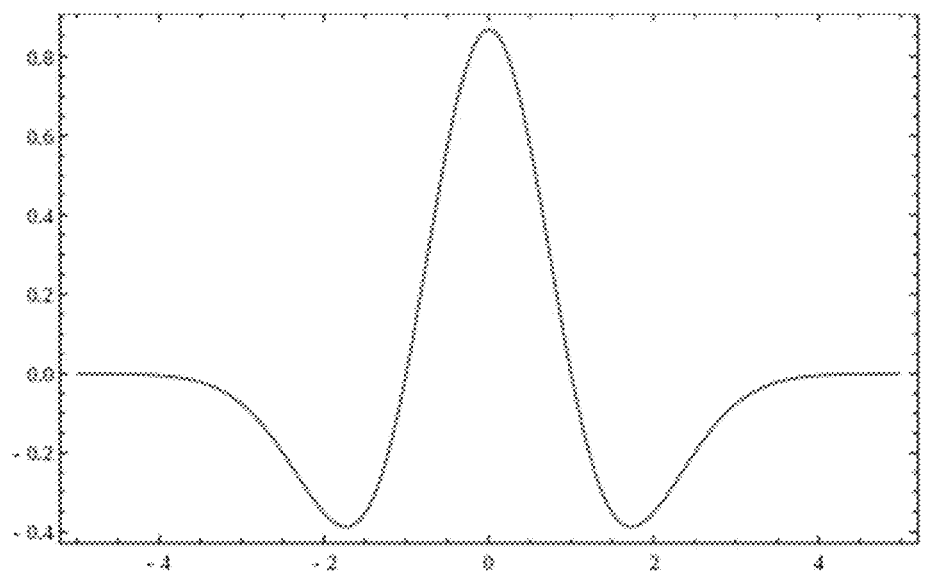
FIG. 9 is a schematic diagram of a curve of Mexican Hat kernel in the method for processing an image according to an embodiment of the present disclosure.

Specifically, referring to FIG. 9, the Mexican Hat kernel may be represented as the following formula.

$$\Psi(x, y) = \frac{1}{\pi\sigma^4}\left(1 - \frac{x^2 + y^2}{2\sigma^2}\right)e^{-(x^2+y^2)/2\sigma^2}$$ formula 5 where x and y represent coordinates of the pixel point.

Firstly, the Gaussian filtering is performed on the to-be-processed image using the m*m window, as shown in formula 6.

$$f = gaussBlur(f_{m*m}) = \sum_{t1,t2 \in m/2} f(x+t1, y+t2) * w_{t1,t2}$$ formula 6 where t1 and t2 represent positions of the filter window, and $w_{t1,t2}$ represents a weight of Gaussian filtering.

Secondly, the two-dimensional Laplacian sharpening is performed on the to-be-processed image, as shown in formula 7.

$$\partial^2 f[Kf(x,y) - kf(x-1,y-1) - kf(x-1,y+1) - kf(x+1,y-1) - kf(x+1,y+1)]$$ formula 7 where K and k are Laplacian operators with regard to a sharpen effect. K and k are modified if the sharpening needs to be strengthened or weakened.

In an example, m=3 and thus m*m=3*3, the formula 6 may written as $$f = gaussBlur(f_{3\times3}) = \sum_{t1,t2 \in 3/2} f(x+t1, y+t2) * w_{t1,t2}$$

when performing the Gaussian filtering.

It could be understood that the specific methods of performing a Mexican Hat filtering on the to-be-processed image in the present implementations may be applied to the steps of performing Mexican Hat filtering on the image mentioned in any of the above-described implementations.

In some implementations of the method for processing an image, the simplified image is a binary image. The binary image is easy to process and may be applied widely.

In some implementations of the method for processing an image, the simplifying step includes: acquiring a signal-to-noise ratio (SNR) matrix according to the to-be-processed image before the simplifying, and simplifying the to-be-processed image before the simplifying according to the SNR matrix to obtain the first image.

In an example, a background subtraction is performed on the to-be-processed image to obtain a background subtracted image, and then a signal-to-noise ratio (SNR) matrix is acquired according to the background subtracted image. In this way, the image with less noise may be acquired and the accuracy of the method for processing an image may be improved.

Specifically, in an example, the SNR matrix may be represented as $$SNR = R/MSE = r(x, y) / \left(\frac{1}{wh}\sum_i \sum_j (f(x_i, y_j) - \overline{f(x, y)})^2\right),$$ formula 8 where x and y represent coordinates of the pixel point, h represents a height of the image and w represents a width of the image, i∈w, j∈h.

Specifically, in an example, the simplified image is a binary image. The binary image may be acquired according to the SNR matrix, in which the binary image is represented as formula 9.

$$BI = \begin{cases} 0 & SNR > \text{mean}(SNR) \\ 1 & SNR <= \text{mean}(SNR) \end{cases} \quad \text{formula 9}$$

When computing the SNR matrix, the background subtraction and/or the filtering may be performed on the to-be-processed image, for example, the subtractive background processing step and/or the filtering processing step as described above. The background subtracted image is obtained according formula 4, and then a matrix of a ratio between the background subtracted image and the background may be acquired according to:

$$R=f/g=\{f(x,y)/g(x,y)|(x,y)\in D\} \quad \text{formula 10}$$

where D represents a dimension (height*width) of the image f.

Therefore, the SNR matrix may be acquired according to:

$$SNR = R/MSE = r(x, y) \Big/ \left( \frac{1}{wh} \sum_i \sum_j (f(x_i, y_j) - \overline{f(x, y)})^2 \right) \quad \text{formula 8}$$

In some implementation of the method for processing an image, analyzing the first image so as to compute a spot determining threshold includes: processing the first image by an Otsu method so as to compute the spot determining threshold. In this way, the spot determining threshold may be found by a sophisticated and simple method, such that the accuracy of the method may be improved and the cost of the method may be reduced. In addition, by computing the spot determining threshold based on the first image, the efficiency and accuracy of the method may be improved.

Specifically, the Otsu method is also called as a maximum class square error method in which the image is split according to the maximum class square error, which means that a probability of wrong split is the minimum and the accuracy is high. It is assumed that a splitting threshold between the foreground and the background of the to-be-processed image is T, a number of the pixel points belonging to the foreground accounts for $\omega_0$ of the whole image, and the average gray level of the pixel points belonging to the foreground is $\mu_0$; a number of the pixel points belonging to the background accounts for $\omega_1$ of the whole image, and the average gray level of the pixel points belonging to the background is $\mu_1$. The average gray level of the to-be-processed image is $\mu$, and the class square error is var. Therefore, following formulas may be acquired.

$$\mu=\omega_0*\mu_0+\omega_1*\mu_1 \quad \text{formula 11}$$

$$\text{var}=\omega_0(\mu_0-\mu)^2+\omega_1(\mu_1-\mu)^2 \quad \text{formula 12}$$

Formula 13 is acquired by substituting the formula 11 into the formula 12.

$$\text{var}=\omega_0\omega_1(\mu_1-\mu_0)^2 \quad \text{formula 13}$$

The splitting threshold T achieving the maximum class square error may be acquired by traversing, which may be configured as the spot determining threshold T.

Figures 10, 11:
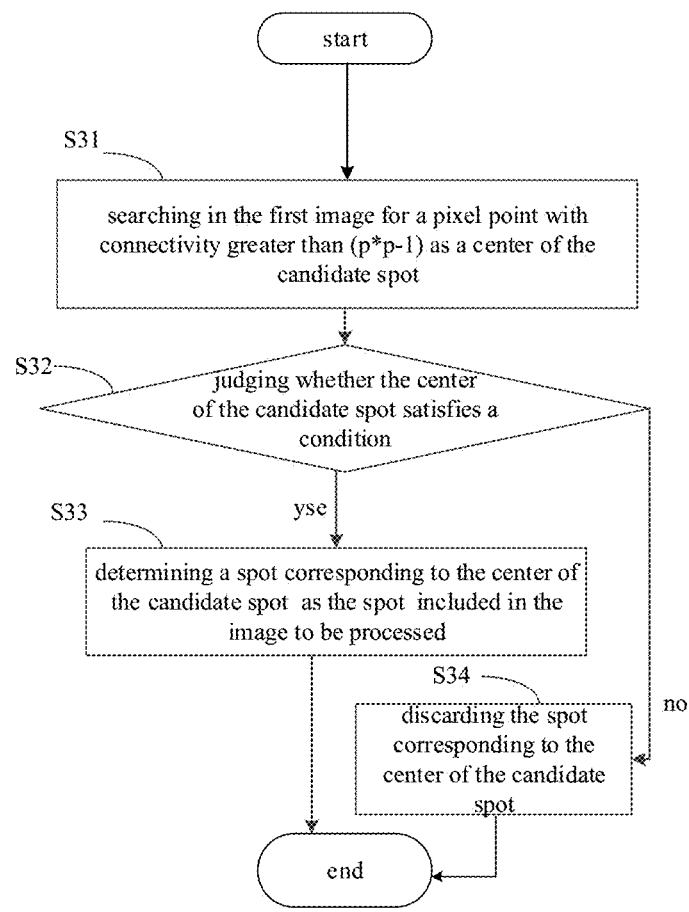
FIG. 10 is a flow chart of a method for processing an image according to an embodiment of the present disclosure.
FIG. 11 is a schematic diagram of eight connected domain in the method for processing an image according to an embodiment of the present disclosure.

In some implementations of the method for processing an image, referring to FIG. 10, judging whether the candidate spot is the spot according to the spot determining threshold includes: step S31, searching in the first image for a pixel point with connectivity greater than (p*p−1) as a center of the candidate spot, in which there is a one-to-one correspondence between the p*p window and the spots, and each value in the p*p window corresponds to one pixel point; and step S32, judging whether the center of the candidate spot satisfies a condition of $I_{max}*A_{BI}*\text{ceof}_{guass}>T$, where $I_{max}$ is a maximum intensity of a center of the p*p window, $A_{BI}$ is a proportion of pixels in the first image being a set value in the p*p window, $\text{ceof}_{gauss}$ is a correlation coefficient between a pixel in the p*p window and a two-dimensional Gaussian distribution, and T is the spot determining threshold, in which p is a natural number and particularly, an odd number greater than 1. The spot corresponding to the center of the candidate spot is determined as the spot included in the to-be-processed image if the condition is satisfied (step S33), and the spot corresponding to the center of the candidate spot is discarded if the condition fails to be satisfied (step S34). In this way, the detection of the spot may be achieved.

Specifically, $I_{max}$ may be understood as the maximum intensity of the center of the candidate spot. In an example, p=3. Referring to FIG. 11, the pixel point with 8 connected domain is searched as the pixel point of the candidate spot. $I_{max}$ may be the maximum intensity of the center of 3*3 window, $A_{BI}$ is a proportion of pixels in the first image being a set value in the 3*3 window, and $\text{ceof}_{gauss}$ is a correlation coefficient between a pixel in the 3*3 window and the two-dimensional Gaussian distribution.

The first image can be the image after the simplifying, such as the binary image. The set value in the binary image may be the value corresponding to the pixel specifying a set condition. In another example, the binary image may include 0 and 1 for indicating different pixel points with different attributes respectively. If the set value is 1, $A_{BI}$ is a proportion of pixels in the binary image being 1 in the p*p window.

In some implementations of the method for processing an image, the value of p can be set as the value of m which is used in the Mexican Hat filtering, i.e. p=m.

In some implementations of the method for processing an image, computing a sub-pixel center coordinate of the spot and/or an intensity value of the sub-pixel center coordinate also includes: computing the sub-pixel center coordinate of the spot by a quadratic function interpolation, and/or extracting the intensity value of the sub-pixel center coordinate by a quadratic spline interpolation. In this way, the accuracy of determining the spot in the image may be improved using the quadratic function and/or the quadratic spline.

Figure 12:
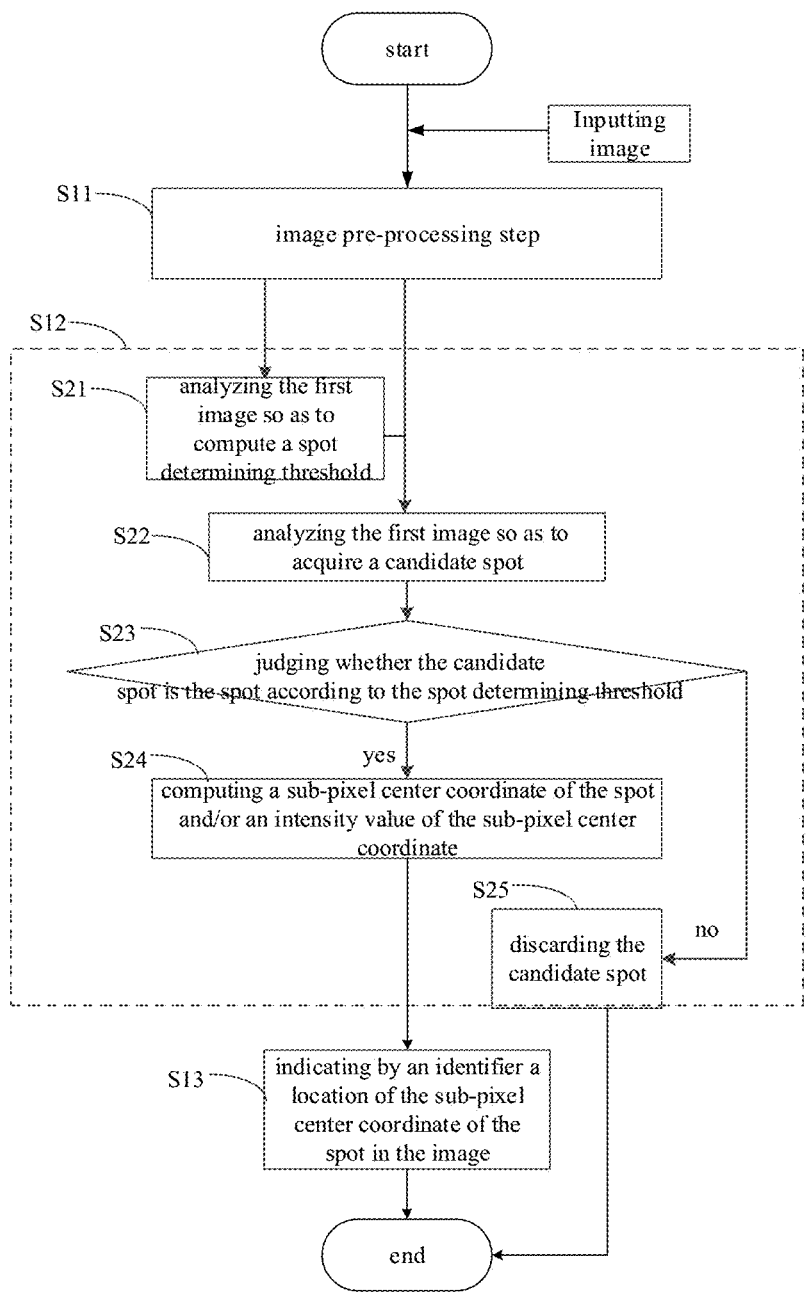
FIG. 12 is a flow chart of a method for processing an image according to an embodiment of the present disclosure.

In some implementations of the method for processing an image, referring to FIG. 12, the method also includes: step S13, indicating by an identifier a location of the sub-pixel center coordinate of the spot in the image. In this way, it is convenient for the user to observe whether the identification of the spot is correct, so as to decide whether to re-position the spot.

Figure 13:
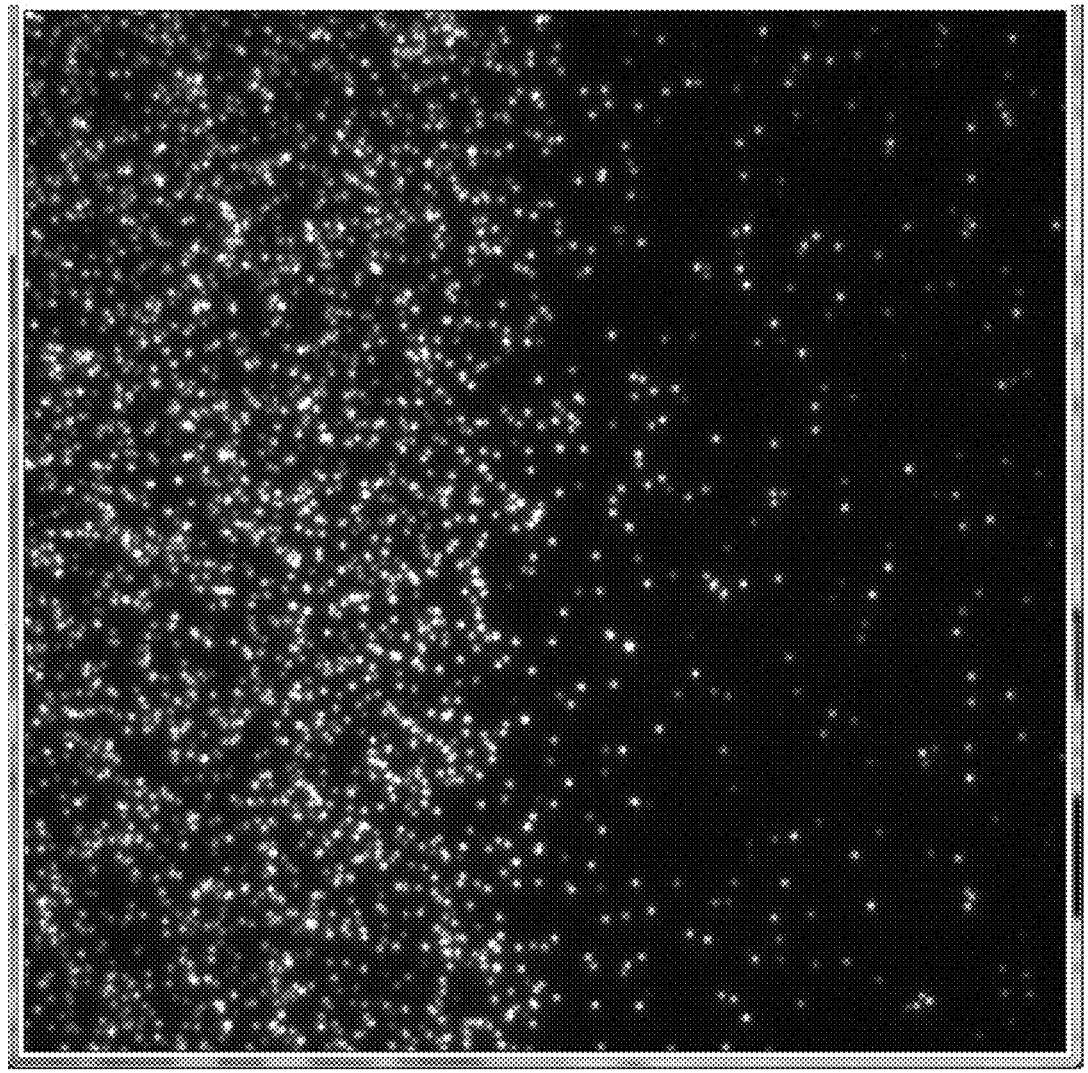
FIG. 13 is a schematic diagram of a to-be-processed image in the method for processing an image according to an embodiment of the present disclosure.
Figure 14:
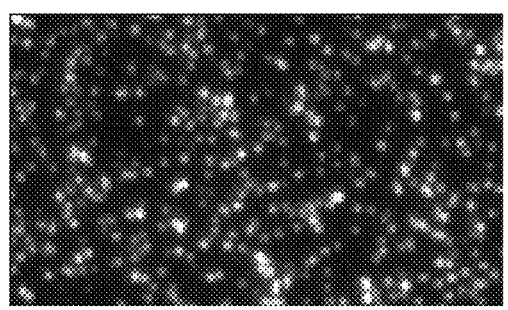
FIG. 14 is a partial enlarged diagram of the to-be-processed image in FIG. 13.
Figure 15:
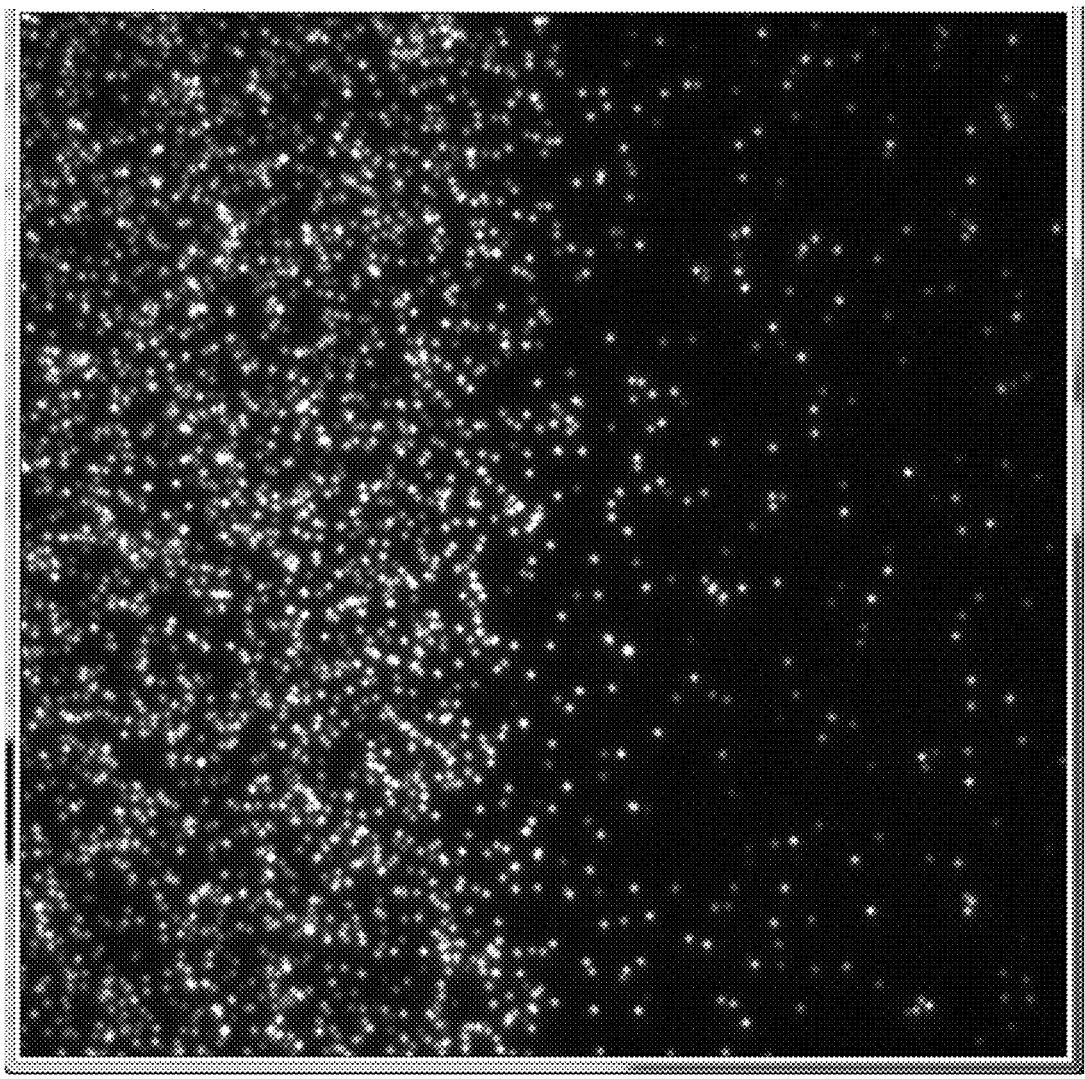
FIG. 15 is a schematic diagram of an image with identified spots in the method for processing an image according to an embodiment of the present disclosure.
Figure 16:
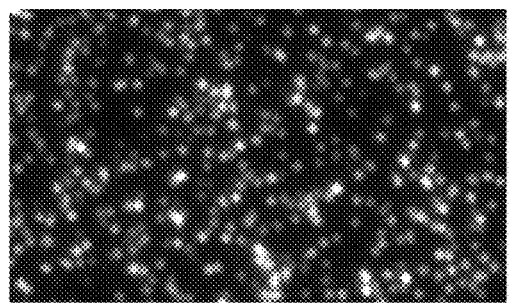
FIG. 16 is a partial enlarged diagram of the image with identified spots in FIG. 15.

Specifically, in an example, the position of the sub-pixel center coordinate in the image may be marked by a crossed marker. Referring to FIG. 13-16, the image to be positioned is shown in FIG. 13, a partial enlarged diagram of the top left corner within a 293*173 range of image in FIG. 13 is shown in FIG. 14, the image with the spots marked by the crossed markers (after the spots are positioned) is shown in FIG. 15, and the partial enlarged diagram of the top left corner within a 293*173 range of image in FIG. 15 is shown in FIG. 16.

Figure 17:
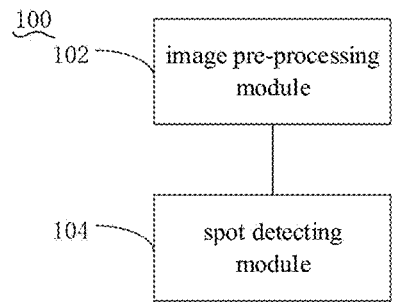
FIG. 17 is a block diagram of a system for processing an image according to an embodiment of the present disclosure.

Referring to FIG. 17, a system 100 for processing an image is provided. The system includes: an image pre-processing module 102, configured to analyze a to-be-processed image so as to obtain a first image, in which the to-be-processed image includes at least one spot having at least one pixel point; and a spot detecting module 104, configured to analyze the first image so as to compute a spot determining threshold; to analyze the first image so as to acquire a candidate spot; and to judge whether the candidate spot is the spot according to the spot determining threshold. With the system 100 for processing an image, the image is denoised by the image pre-processing module 102, such that computation of the spot detecting module 104 may be decreased. In addition, by judging whether the candidate spot is the spot according to the spot determining threshold, the accuracy of determining the image spot is improved.

It should be noted that the description of the method for processing an image is also suitable for the system 100, which will not be described in detail.

Figure 18:
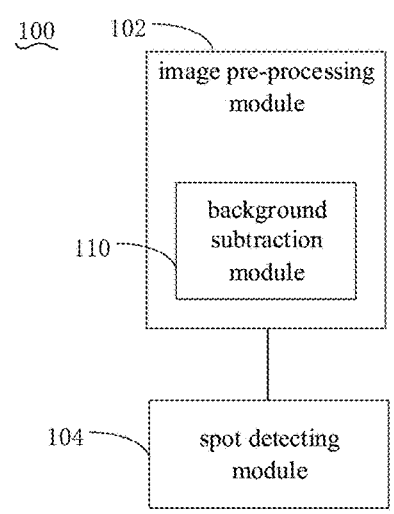
FIG. 18 is a block diagram of a system for processing an image according to an embodiment of the present disclosure.

In some implementations of the system 100, referring to FIG. 18, the image pre-processing module 102 includes a background subtraction module 110. The background subtraction module 110 is configured to perform a background subtraction on the to-be-processed image so as to acquire the first image.

Figure 19:
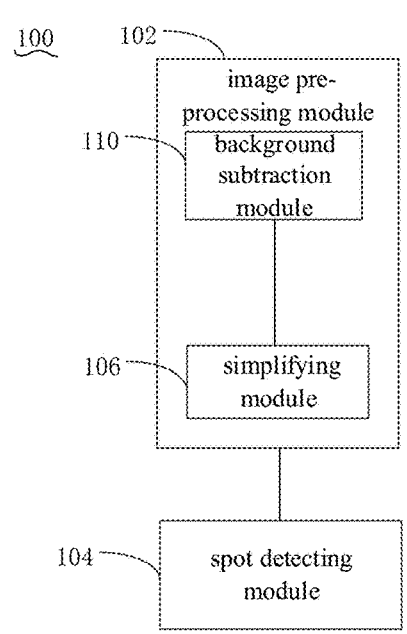
FIG. 19 is a block diagram of a system for processing an image according to an embodiment of the present disclosure.

In some implementations of the system 100, referring to FIG. 19, the image pre-processing module 102 includes a simplifying module 106. The simplifying module 106 is configured to simplify the to-be-processed image after the background subtraction so as to acquire the first image.

Figure 20:
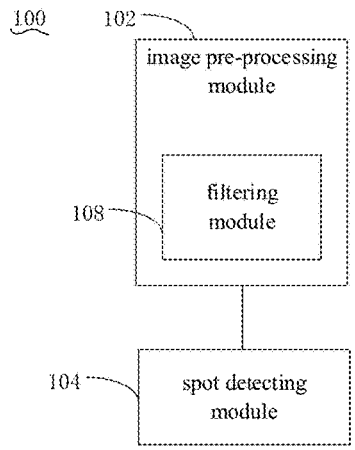
FIG. 20 is a block diagram of a system for processing an image according to an embodiment of the present disclosure.

In some implementations of the system 100, referring to FIG. 20, the image pre-processing module 102 includes an image filtering module 108. The image filtering module 108 is configured to filter the to-be-processed image so as to acquire the first image.

Figure 21:
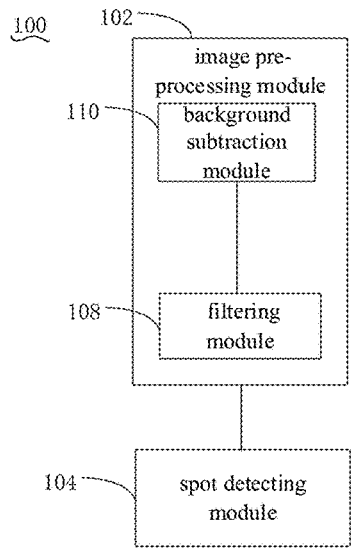
FIG. 21 is a block diagram of a system for processing an image according to an embodiment of the present disclosure.

In some implementations of the system 100, referring to FIG. 21, the image pre-processing module 102 includes a background subtraction module 110 and an image filtering module 108. The background subtraction module 110 is configured to perform a background subtraction on the to-be-processed image, the image filtering module 108 is configured to filter the background subtracted image so as to acquire the first image.

Figure 22:
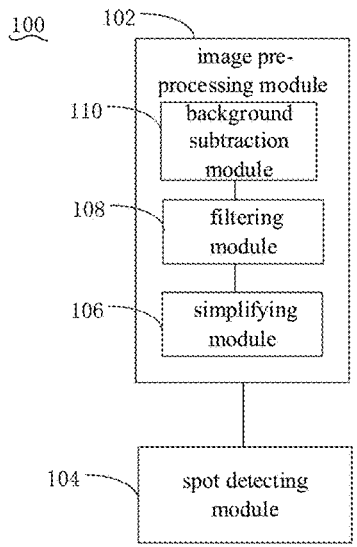
FIG. 22 is a block diagram of a system for processing an image according to an embodiment of the present disclosure.

In some implementations of the system 100, referring to FIG. 22, the image pre-processing module 102 includes a simplifying module 106. The simplifying module 106 is configured to simplify the to-be-processed image after the background subtraction and the filtering so as to acquire the first image.

Figure 23:
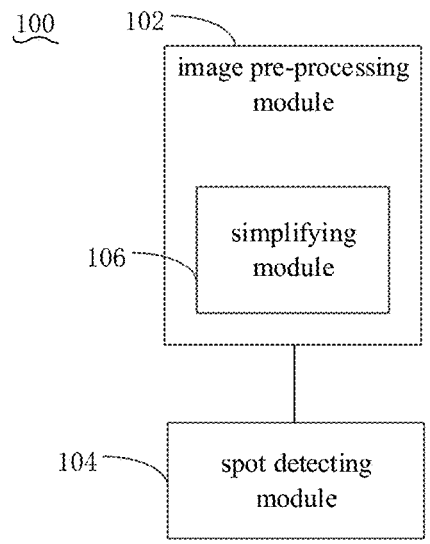
FIG. 23 is a block diagram of a system for processing an image according to an embodiment of the present disclosure.

In some implementations of the system 100, referring to FIG. 23, the image pre-processing module 102 includes a simplifying module 106. The simplifying module 106 is configured to simplify the to-be-processed image so as to acquire the first image.

In some implementations of the system 100, the background subtraction module 110 is configured to determine a background of the to-be-processed image by an opening operation; and to perform the background subtraction on the to-be-processed image according to the background.

In some implementations of the system 100, the image filtering module 108 is configured to perform a Mexican Hat filtering on the to-be-processed image.

In some implementations of the system 100, when using the image filtering module 108 to perform a Mexican Hat filtering, a Gaussian filtering is performed on the to-be-processed image using an m*m window, and to perform a two-dimensional Laplacian sharpening on the to-be-processed image after the Gaussian filtering, in which m is a natural number and particularly, an odd number greater than 1.

In some implementations of the system 100, the simplified image is a binary image. When using the simplifying module 106 to simplify the image, a signal-to-noise ratio matrix is acquired according to the to-be-processed image before the simplifying, and to simplify the to-be-processed image before the simplifying according to the signal-to-noise ratio matrix so as to acquire the simplified image.

In some implementations of the system 100, the spot detecting module 104 is configured to compute a sub-pixel center coordinate of the spot and/or an intensity value of the sub-pixel center coordinate, when it is judged that the candidate spot is the spot; and to discard the candidate spot, when it is judged that the candidate spot is not the spot.

In some implementations of the system 100, the spot detecting module 104 is configured to process the first image by an Otsu method so as to compute the spot determining threshold. In some implementations of the system 100, the spot detecting module 104 is configured to: search in the first image for a pixel point with connectivity greater than (p*p−1) as a center of the candidate spot; and to judge whether the center of the candidate spot satisfies a condition of $I_{max}*A_{BI}*ceof_{guass}>T$, where $I_{max}$ is a maximum intensity of a center of the p*p window, $A_{BI}$ is a proportion of pixels in the first image being a set value in the p*p window, $ceof_{guass}$ is a correlation coefficient between a pixel in the p*p window and a two-dimensional Gaussian distribution, and T is the spot determining threshold, in which p is a natural number and particularly, an odd number greater than 1; to determine a spot corresponding to the center of the candidate spot as the spot when the condition is satisfied; and to discard the spot corresponding to the center of the candidate spot when the condition fails to be satisfied.

In some implementations of the system 100, the spot detecting module 104 is configured to: compute the sub-pixel center coordinate of the spot by a quadratic function interpolation, and/or extract the intensity value of the sub-pixel center coordinate by a quadratic spline interpolation.

Figure 24:
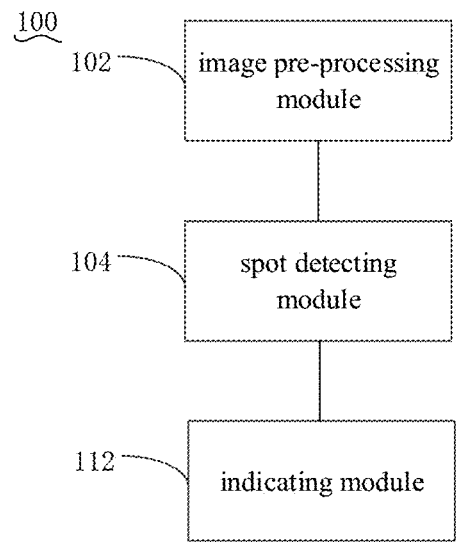
FIG. 24 is a block diagram of a system for processing an image according to an embodiment of the present disclosure.

In some implementations of the system 100, referring to FIG. 24, the system 100 includes an indicating module 112 configured to indicate by an identifier a location of the sub-pixel center coordinate of the spot in the image.

Figure 25:
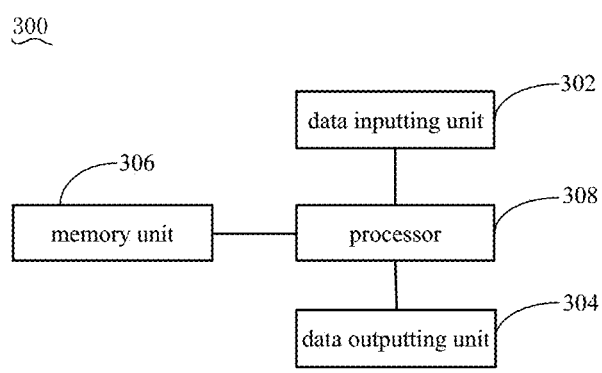
FIG. 25 is a block diagram of a system for processing an image according to an embodiment of the present disclosure.

Referring to FIG. 25, an image processing system 300 is provided, including a data inputting unit 302 configured to input data; a data outputting unit 304 configured to output data; a memory unit 306 configured to store data including a computer executable program; and a processor 308 configured to execute the computer executable program for performing the method for processing an image described above. The image processing system 300 may improve the accuracy of determining the spot in the image.

A computer readable memory medium is provided in the present disclosure. The computer readable memory medium is configured to store a program that, when executed by a computer, causes the computer to perform the method for processing an image described above. The computer readable memory medium may improve the accuracy of determining the spot in the image. The computer readable storage medium may be, but is not limited to, read-only memories, magnetic disks, or optical disks.

Reference throughout this specification to "one embodiment", "some embodiments," "an embodiment", "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated that the above embodiments are explanatory and cannot be construed to limit the present disclosure, and changes, alternatives, and modifications can be made in the embodiments without departing from scope of the present disclosure by those skilled in the art.

What is claimed is:

1. A method for processing an image, comprising:
an image pre-processing step, comprising: simplifying a to-be-processed image so as to produce a first image, wherein the to-be-processed image comprises at least one spot having at least one pixel point; and
a spot detecting step, comprising:
analyzing the first image so as to compute a spot determining threshold;
analyzing the first image so as to acquire a candidate spot; and
judging whether the candidate spot meets the spot determining threshold, comprising:
searching in the first image for a pixel point with connectivity greater than (p*p−1) as a center of the candidate spot;
judging whether the center of the candidate spot satisfies a condition of $I_{max}*A_{BI}*ceof_{guass}>T$, where $I_{max}$ is a maximum intensity of a center of the p*p window, $A_{BI}$ is a proportion of pixels in the first image being a set value in the p*p window, $ceof_{guass}$ is a correlation coefficient between a pixel in the p*p window and a two-dimensional Gaussian distribution, and T is the spot determining threshold, where p is an odd number greater than 1; and
determining a spot corresponding to the center of the candidate spot as the spot when the condition is satisfied; or
discarding the spot corresponding to the center of the candidate spot when the condition fails to be satisfied.

2. A method according to claim 1, wherein the image pre-processing step comprises performing a background subtraction on the to-be-processed image.

3. A method according to claim 2, wherein the simplifying the to-be-processed image is after the background subtraction.

4. A method according to claim 1, wherein the image pre-processing step comprises filtering the to-be-processed image.

5. A method according to claim 2, wherein the image pre-processing step comprises filtering the to-be-processed image after the background subtraction.

6. A method according to claim 5, wherein the simplifying the to-be-processed image is after the background subtraction and the filtering.

7. A method according to claim 1, wherein the spot detecting step comprises:
computing a sub-pixel center coordinate of the spot and/or an intensity value of the sub-pixel center coordinate, when it is judged that the candidate spot is the spot; and
discarding the candidate spot, when it is judged that the candidate spot is not the spot.

8. A method according to claim 2, wherein performing a background subtraction on the to-be-processed image comprises:
determining a background of the to-be-processed image by an opening operation; and
performing the background subtraction on the to-be-processed image according to the background.

9. A method according to claim 4, wherein the filtering is a Mexican Hat filtering.

10. A method according to claim 9, wherein performing the Mexican Hat filtering comprises:
performing a Gaussian filtering on the to-be-processed image using an m*m window, where m is an odd number greater than 1; and
performing a two-dimensional Laplacian sharpening on the to-be-processed image after the Gaussian filtering.

11. A method according to claim 1, wherein the simplifying is a binary processing.

12. A method according to claim 1, wherein the simplifying comprises acquiring a signal-to-noise ratio matrix according to the to-be-processed image before the simplifying, and simplifying the to-be-processed image before the simplifying according to the signal-to-noise ratio matrix so as to acquire the first image.

13. A method according to claim 1, wherein analyzing the first image so as to compute a spot determining threshold comprises:
processing the first image by an Otsu method so as to compute the spot determining threshold.

14. A method according to claim 7, wherein computing a sub-pixel center coordinate of the spot and/or an intensity value of the sub-pixel center coordinate comprises:
computing the sub-pixel center coordinate of the spot by a quadratic function interpolation, and/or computing the intensity value of the sub-pixel center coordinate by a quadratic spline interpolation.

15. A method according to claim 7, further comprising:
indicating by an identifier a location of the sub-pixel center coordinate of the spot in the first image and/or in the to-be-processed image.

16. A computer readable memory medium, configured to store a program that when executed by a computer causes the computer to perform the method for processing the image in gene sequencing according to claim 1.

17. A system for processing an image, comprising:
a processor;
memory configured to store a computer executable program that, when executed b the processor, perform operations comprising:
analyze a to-be-processed image so as to obtain a first image, the analyzing the to-be-processed image comprising simplifying the to-be-processed image so as to acquire the first image, wherein the to-be-processed image comprises at least one spot having at least one pixel point;
analyze the first image so as to compute a spot determining threshold;
analyze the first image so as to acquire a candidate spot;
judge whether the candidate spot is the spot according to the spot determining threshold;
search in the first image for a pixel point with connectivity greater than (p*p−1) as a center of the candidate spot; and
judge whether the center of the candidate spot satisfies a condition of $I_{max}*A_{BI}*ceof_{guass}>T$, where $I_{max}$ is a maximum intensity of a center of a p*p window, $A_{BI}$ is a proportion of pixels in the first image being a set value in the p*p window; $ceof_{guass}$ is a correlation coefficient between a pixel in the p*p window and a two-dimensional Gaussian distribution, and T is the spot determining threshold, where p is an odd number greater than 1; and determine a spot corresponding to the center of the candidate spot as the spot when the condition is satisfied; or discard the spot corresponding to the center of the candidate spot when the condition fails to be satisfied.

18. An image processing system, comprising:

memory configured to store data comprising a computer executable program; and a processor, configured to perform the computer executable program, which performs the method for processing an image in gene sequencing according to claim 1.

19. The system according to claim 17, wherein the analyzing the to-be-processed image further comprises performing a background subtraction on the to-be-processed image before simplifying the to-be-processed image.

20. The system according to claim 19, wherein the analyzing the to-be-processed image further comprises filtering the to-be-processed image after the background subtraction and the simplifying the to-be-processed image being after the filtering.

* * * * *